United States Patent Office 3,500,920
Patented Mar. 17, 1970

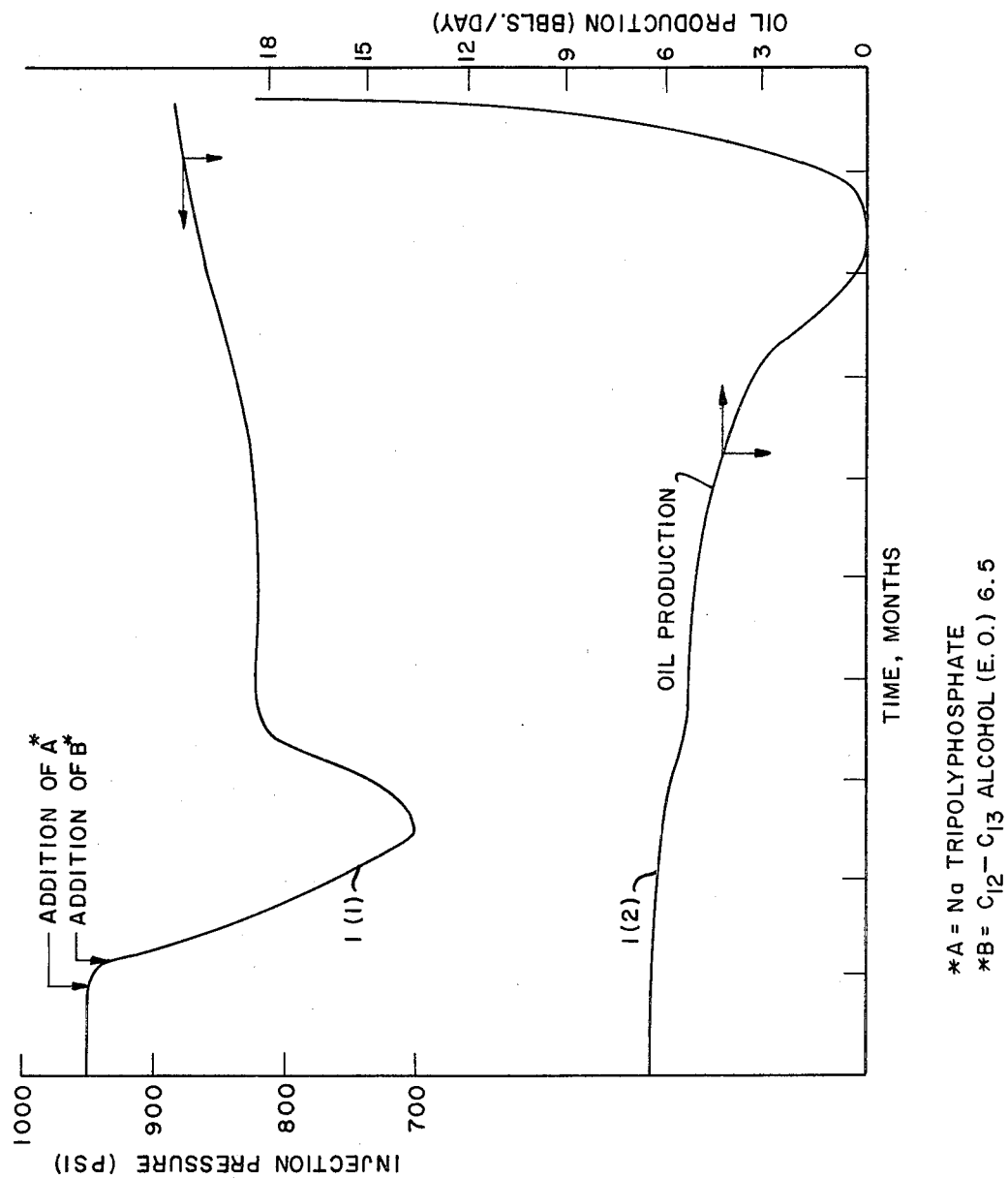

3,500,920
CHEMICAL INJECTION OF SLUGS OF TWO DISSIMILAR AQUEOUS SOLUTIONS TO RECOVER OIL
Philip J. Raifsnider, Denver, Colo., assignor to Shell Oil Company, New York, N.Y., a corporation of Delaware
Filed May 23, 1968, Ser. No. 731,517
Int. Cl. E21b 43/22
U.S. Cl. 166—273    7 Claims

ABSTRACT OF THE DISCLOSURE

An improved method for recovering oil from underground formations by treating said formations at lowered injectivity pressures with slugs of an aqueous liquid resulting in a synergistic mixture of a nonionic surfactant and a sequestering agent.

BACKGROUND OF THE INVENTION

This invention relates to the displacement of oil from the pores of subterranean, oil-containing reservoirs, and more particularly to special surface-active systems to be used with "waterflooding" techniques to improve the oil displacement efficiency of waterfloods.

Knowledge is widespread in the oil industry that the so-called "primary recovery" techniques, which include natural flow, gas lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has led to the use of the so-called "secondary recovery" and "tertiary recovery" techniques which have as their primary purpose the economical recovery of additional quantities of the residual oil known to be present in the reservoir.

Probably, one of the more common secondary or tertiary recovery techniques is the so-called "waterflooding" in which aqueous fluids are injected at one point in the reservoir at pressures sufficient to be forced out into the reservoir and toward a spaced production well or wells, there, in effect, displacing it from the pores of the reservoir and driving the oil ahead of the water front.

However, waterflooding is only advantageous when the cost of injecting water and necessary chemical modifiers is less than the value of the oil recovered. Therefore, the displacement efficiency of waterfloods has been the determining factor of whether such a technique will be used.

A problem in many waterfloods is that high injection pressures are required necessitating special equipment and making the process very costly. One reason for the requirement of high injection pressures is because the pores and capillaries of the reservoir contain small discontinuous hydrocarbon (oil and/or oil and gas) droplets which seriously impede the ability of water to pass through the pores. These hydrocarbon droplets are trapped and will not be displaced by water of existence of high interfacial tensions at the hydrocarbon-water boundary. A reduction in the interfacial tension between the water and the oil will tend to increase the amount of oil that will be displaced by the water. Thus, various aqueous surfactant systems have been proposed for use in waterflooding processes for recovering oil. In many such prior systems, the interfacial tension between the oil and water is reduced from a characteristic value in the order to 50 dynes per centimeter to a value of from about 1 to 10 dynes per centimeter. If the interfacial tension is reduced to only about 10 dynes per centimeter, the increase in the amount of oil that can be recovered is not generally significant. Thus, the cost of obtaining the reduction in the interfacial tension is apt to be more than the value of the increased amount of oil that is recovered in many cases. Also, in general, the pressure injectivity remains high and the cost factor is not reduced by any appreciable means.

Many aqueous systems containing surfactants have been used to effect reduction in pressure injectivity and to aid in oil recovery and such systems are desired in U.S. Patents 3,330,344; 3,348,611 and 3,366,174 in which improved and effective oil recovery is achieved by treating the formation with an aqueous liquid containing oil-solubilizing aqueous solution of surfactant miscelles that are combined with molecules of an amphiphilic organic compound of low water solubility. However, such systems still require high water injectivity pressures to effect desired increase in oil recovery at substantial cost.

SUMMARY OF THE INVENTION

It has now been discovered that oil recovery using a fluid drive can be effectively accomplished at reduced pressure injectivity and oil recovery substantially increased by injecting into the oil-bearing zone of an underground formation slugs of aqueous solutions resulting in a synergistic mixture of a water-soluble nonionic oxyalkylated alkanol surfactant agent and a water-soluble polyphosphate salt. The slugs can be injected into the formation sequentially or alternatively as for example, an aqueous slug containing the polyphosphate salt can be injected into the formation, followed by an aqueous slug of the nonionic surfactive agent and the treatment is repeated until the desired pressure drop is noted and lowering of the interfacial tension between the oil and water in the formation is noted, indicating increase in permeability of the formation to waterflooding drive or other types of fluid drives. The formations thus treated should be suitably provided with injection and production wells and the fluid system which may be miscible and/or immiscible fluid drive such as a water and/or steam or a miscible driving fluid such as $CO_2$ or a volatile hydrocarbon, e.g., LPG or the like or an aqueous surfactant system as described in the references cited above.

DESCRIPTION OF THE PREFERRED EMBODIMENT

The oxyalkylated alkanol surfactant aqueous slugs when used in combination with aqueous slugs containing a water-soluble polyphosphate can be water soluble oxyalkylated alkanols having from about 8 to about 20 carbon atoms and can be represented by the general Formula I represented by

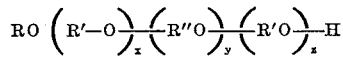

where R is an alkyl radical of 8 to 20 and preferably 10–15 carbon atoms, R' and R'' are dissimilar alkyl radicals of from 1–6 carbon atoms and preferably are $C_2H_4$ and $C_3H_6$ radicals respectively, $x$ and $z$ are positive integers of at least 1 and $y$ can be zero or a positive integer as $x$ or $z$. Preferred oxyalkylated alkanols can be represented by the general Formula II represented by

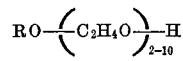

where R is an alkyl radical of 10–15 carbon atoms, the alcohol used in the ethoxylation being a mixture of alcohols of 10 to 15 carbon atoms. The ethoxylation of the alcohols can be accomplished by means well known in the art. The ethoxylation of primary alcohols to form products represented by Formula II can be achieved using a strong base of Lewis acid catalysts such as NaOH, KOH, $BF_3$ or $SnCl_2$. Mixed oxyalkylated mixtures of primary alcohols to produce compounds represented by Formula II can be prepared by the method described in U.S. Patents 3,036,130 or 3,101,574 or as described in copending patent application to Tsatsos et al., Ser. No. 661,546 filed Aug. 18, 1967, and illustrated by the following example.

An alkoxylate was prepared employing as the alcohol feed an anhydrous mixture derived from 0.448 g. of sodium hydroxide and 125 g. of mixed $C_{12}$, $C_{13}$, $C_{14}$ and $C_{15}$ primary alcohols, in substantially equal proportions by weight, wherein approximately 80% of the alcohol of each carbon number was straight-chain, approximately 10% of the alcohol of each carbon number was beta-methyl branched and the remainder of the alcohol of each carbon number consisted of alcohols having beta-ethyl, beta-propyl, beta-butyl and beta-amyl branched structures.

The temperatures of the reactor in which the mixture was maintained was raised to $145 \pm 5°$ C. and kept at that temperature as ethylene oxide was introduced at the rate of about 4–5 g./minute to the stirred reaction mixture. During the approximately 1-hour period required to add 166 g. of ethylene oxide, the pressure remained at about 50 p.s.i.g. as the temperature was maintained below 150° C. At the conclusion of the ethylene oxide addition, the stirring was continued until the pressure decreased to about 10 p.s.i.g.

A similar procedure was employed to introduced and react 145 g. of propylene oxide at a temperature of about 140° C. and a pressure during addition of 100–120 p.s.i.g. After the propylene oxide addition and after the pressure had decreased to about 30 p.s.i.g., ethylene oxide addition was begun again and carried out as before. After the final reaction period subsequent to the second addition of ethylene oxide, the product mixture was maintained at about 100° C. under a total pressure of 10 mm. to remove volatiles. The product mixture was then cooled to about 70° C. and transferred with the aid of nitrogen pressure into a bottle containing 0.65 g. of acetic acid.

Analysis of the product mixture by its nuclear magnetic resonance spectrum in conjunction with the weights of the alkylene oxide employed indicated a mixture of alcohol alkoxylates having a first block averaging 6 ethylene oxide units, a second block averaging 4 propylene oxide units, and a third and a terminal block averaging 6 ethylene oxide units.

The ethoxylated alcohols are available commercially from Shell Chemical Company under the trade name "Neodol" or from Conoco under the name "Alfol" and others. The "Neodol" identified as Neodol 23–6.5 which is a mixture of $C_{12}$–$C_{13}$ alcohol having 6.5 (EO) ethoxylate groups and has the following properties as shown in Table I.

Table I

| | |
|---|---|
| Detergent alcohol carbon number range | $C_{12}$–$C_{13}$ |
| Melting range, ° C. | 11–15 |
| Color, APHA (Pt-Co) | 40 |
| Specific gravity, 50/25° C. | 0.963 |
| Flash point, cleveland open cup, ° F. | 410 |
| Fire point, cleveland open cup, ° F. | 445 |
| Cloud point, 1% solution, ° C. | 45 |
| Hydroxyl number, mg. KOH/gm. | 116 |
| Water (Karl Fischer), percent w. | 0.3 |
| Acid value, eq./100 g. | <0.001 |
| Odor | Mild |

Other ethoxylated alcohols useful in aiding in oil recovery are shown in Table II and have the following properties where EO is —$CH_2CH_2O$— radical.

TABLE II

| | Ethoxylates | | |
|---|---|---|---|
| Analyses | $C_{12}$–$C_{15}$ 3 EO | $C_{12}$–$C_{15}$ 7.5 EO | $C_{12}$–$C_{15}$ 9 EO |
| Ash, percent w | 0.2 max | 0.01 max | 0.01 max. |
| Color, APHA | 100 max | 75 max | 75 max. |
| pH, 1% solution | 5.5–6.5 | Within 0.5 water used. | Within 0.5 water used. |
| Acid value, eq./100 g | 0.004 max | 0.0003 max | 0.0003 max. |

Conoco "Alfol" alcohols such as "Alfonic" 1012–6 or 1218–6 are trade names for products having the structural formula: $CH_3$—$(CH_2)_x$—$CH_2O(CH_2CH_2O)_n$—H where $x$ is 8–16 and $n=5$–8. Thus, Alfonic 1012–6 is a $C_{10-12}$ primary alcohol containing 6 ethylene oxide units and 1218–6 is a $C_{12-18}$ primary alcohol containing 6 ethylene oxide units. The alkoxylated alcohols can be modified by reacting the alcohols with alkylene imines or sulfides so that some of the alkylene units in the molecule would also contain nitrogen and/or sulfur atoms and include polyalkylene imine-alkyl derivatives or mixtures of polyalkylene imines and ethoxylated alcohols as noted in U.S. Patent 3,347,789.

The second essential material injected in the formation is an aqueous slug or slugs of a water-soluble polyphosphate salt such as the alkali metal polyphosphate salt e.g., Na, K or Li tri- or hexamethaphosphates or thiopolyphosphates, preferred being the sodium tripolyphosphate and hexamethaphosphate. Also mixtures of mixed salts of polyphosphates can be used such as Na-Mg polyphosphates or Na-Ca polyphosphate.

The injection of the aqueous slugs alternately containing the polyphosphates and the nonionic alkoxylated alcohols prior to subjecting the formation to a fluid drive which can be a miscible and/or immiscible fluid drive and preferably a waterflooding drive and be accomplished by any suitable means.

The effectiveness of alternate aqueous slug injection of aqueous solutions containing polyphosphate and aqueous solutions containing alkoxylated alcohols, followed by a waterflood to recover oil and substantially reduced pressures and increased oil recovery, is illustrated by the following field test:

The chemical injection method used can be as follows: Three hundred pounds per day of sodium tripolyphosphate was injected into the formation for eight consecutive days. Next, 440 pounds per day of nonionic surfactant $C_{12}$–$C_{13}$ alcohol contain 6.5 EO units such as "Neodol" 23–6.5 was thereafter injected for five consecutive days. The addition of this surfactant was accomplished in about 15 minutes; thus resulting in an extremely high, short-term concentration exceeding one percent in the injection water for one hour. This was followed by 300 pounds per day of tripolyphosphate for five days.

The treatment was repeated as described above and a continuing addition of 50 pounds per day of tripolyphosphate was made for four months.

As illustrated in FIGURE 1 (1), injection pressure in this flood prior to treatment was 950 p.s.i.g. Immediately after the surfactant was added, the injection pressure fell to 850 p.s.i.g. After one month's operation, and without additional wetting agent, a minimum injection pressure of 700 p.s.i.g. was realized. After four month's operation, injection pressures ranged from 775 to 825 p.s.i.g. After ten months, injection pressures are nearing the initial readings of 950 p.s.i.g.

From FIGURE 1 (2), it can be noted that the pressure reduction reflects displacement of additional oil from a previously watered-out producing well when it was reactivated by the process of this invention. The well tested had been shut-in six months prior to this test when its production had declined to 4 bbls. oil and 250 bbls. water per day.

As shown in FIGURE 1 (2), when returned to production, the well started producing at the rate of 6 bbls. oil/day.

From the above results, it is reasonably certain that the pressure reduction from the injection of the aqueous slugs has resulted from decreased oil saturation in the region of the wellbore, which increases the effective permeability of the formations to waterflooding. Also, the decrease in oil saturation most likely results from the lowering of the interfacial tension between oil and water by the synergistic combination of the polyphosphate and alkoxylated alcohol aqueous slugs.

Earth formations conditioned by injection therein of alternate slugs of aqueous solutions containing the synthetic additive mixture of this invention produce more oil more efficiently when such treated formations are subsequently subjected to a fluid drive to recover oil. Such drives include water flooding, steam flooding, miscible flooding and combinations thereof such as water-steam flood drives and the like. The fluid drives can contain thickeners, viscosity increasers, pushers and the like, e.g., polyacrylamides and derivatives, polyalkylene oxide polymers, polyvinyl-alcohol sulfonate and the like some of which are described in U.S. Patents 3,341,319; 3,332,904; 3,254,719; 3,367,418; 3,368,620 and 3,370,649.

It is understood that various changes in the details described to explain the invention can be made by persons skilled in the art within the scope of the invention as expressed in the appended cases.

I claim as my invention:

1. In an oil-producing process in which oil in an oil-containing reservoir formation is displaced, the step of alternately injecting into said formation (1) an aqueous slug containing a water-soluble polyphosphate and (2) an aqueous slug containing a water-soluble nonionic surfactant alkoxylated alcohol and thereafter recovering oil from said reservoir formation.

2. The process of claim 1 wherein alternating steps 1 and 2 are repeated until the interfacial tension, injectivity pressure is reduced to a minimum.

3. The process of claim 1 wherein the polyphosphate is an alkali metal polyphosphate and the alkoxylated alcohol is an ethoxylated primary alcohol having from 8 to 20 carbon atoms.

4. The process of claim 3 wherein the polyphosphate is sodium tripolyphosphate and the alcohol is a $C_{12-13}$ alcohol containing 2.6 ethoxy units in the molecule.

5. The process of claim 1 in which the formation is subsequently subjected to a fluid drive.

6. The process of claim 1 in which the formation is subsequently subjected to a water drive.

7. The process of claim 1 in which the formation is subsequently subjected to a water drive containing a water thickener.

References Cited

UNITED STATES PATENTS

| 2,341,500 | 2/1944 | Detling. | |
|---|---|---|---|
| 3,258,071 | 6/1966 | Yu Shen et al. | 166—9 |
| 3,346,047 | 10/1967 | Townsend et al. | 166—9 |
| 3,410,342 | 12/1968 | Abdo | 166—9 |

CHARLES E. O'CONNELL, Primary Examiner

IAN A. CALVERT, Assistant Examiner

U.S. Cl. X.R.

166—275